US011499472B2

(12) United States Patent
Whittington et al.

(10) Patent No.: US 11,499,472 B2
(45) Date of Patent: Nov. 15, 2022

(54) ELECTRIC MULTIPLE STAGE VARIABLE FORCED AIR INDUCTION SYSTEM

(71) Applicant: Venomaire, LLC, Draper, UT (US)

(72) Inventors: Daniel William Whittington, Draper, UT (US); Scott C. Pugh, West Valley City, UT (US)

(73) Assignee: Venomaire, LLC, Draper, UT (US)

( * ) Notice: Subject to any disclaimer, the term of this patent is extended or adjusted under 35 U.S.C. 154(b) by 0 days.

(21) Appl. No.: 16/767,960

(22) PCT Filed: Nov. 29, 2018

(86) PCT No.: PCT/US2018/063140
§ 371 (c)(1),
(2) Date: May 28, 2020

(87) PCT Pub. No.: WO2019/108843
PCT Pub. Date: Jun. 6, 2019

(65) Prior Publication Data
US 2020/0386150 A1 Dec. 10, 2020

Related U.S. Application Data

(60) Provisional application No. 62/668,681, filed on May 8, 2018, provisional application No. 62/593,117, filed on Nov. 30, 2017.

(51) Int. Cl.
*F02B 39/10* (2006.01)
*F02D 41/00* (2006.01)

(52) U.S. Cl.
CPC .......... *F02B 39/10* (2013.01); *F02D 41/0007* (2013.01); *F02D 2200/0404* (2013.01)

(58) Field of Classification Search
CPC ........ F02B 37/10; F02B 37/004; F02B 39/10; F02B 33/40; F02D 41/0007;
(Continued)

(56) References Cited

U.S. PATENT DOCUMENTS 6,062,026 A 5/2000 Woollenweber et al.
6,079,211 A 6/2000 Woollenweber et al.
(Continued)

FOREIGN PATENT DOCUMENTS

JP 2007187080 7/2007
WO 2015195576 12/2015

OTHER PUBLICATIONS

International Search Report and Written Opinion dated Feb. 5, 2019 for international application PCT/US2018/063140.
(Continued)

*Primary Examiner* — Audrey B. Walter
*Assistant Examiner* — Dapinder Singh

(57) ABSTRACT

Electric multiple stage variable forced air induction systems are disclosed herein. A housing defines a conduit therethrough with an exit (output) opening and an entry (intake) opening. The exit opening is to couple to and provide airflow to an air intake opening of a combustion engine. The entry opening is to receive air for delivery through the conduit to the exit opening. A plurality of stages generate thrust to increase airflow through the conduit and to the air intake opening of the combustion engine. Each stage can comprise a turbine housing component, a turbine rotor to rotate about an axis and generate thrust on air as it passes through the conduit in a direction parallel to the axis, and a motor coupled to and configured to turn the turbine rotor. One or more processing devices receive inputs indicating engine parameters and control the motor of each stage.

19 Claims, 4 Drawing Sheets

(58) Field of Classification Search
CPC ....... F02D 2200/0404; F02D 2200/703; F04D 19/007; F04D 25/16; Y02T 10/12
See application file for complete search history.

(56) References Cited

U.S. PATENT DOCUMENTS

| | | |
|---|---|---|
| 2003/0110770 A1 | 6/2003 | Criddle et al. |
| 2008/0292480 A1* | 11/2008 | Godeke .................. H02K 5/128 417/423.7 |
| 2015/0176481 A1 | 6/2015 | Jaeger |
| 2015/0308328 A1 | 10/2015 | Whittington |
| 2016/0102677 A1* | 4/2016 | An ........................ F02B 39/005 417/369 |
| 2017/0122229 A1 | 5/2017 | Ossareh et al. |

OTHER PUBLICATIONS

Extended European Search Report dated Jul. 22, 2021 for EP application 18883469.1.

* cited by examiner

ELECTRIC MULTIPLE STAGE VARIABLE FORCED AIR INDUCTION SYSTEM

RELATED APPLICATIONS

This application is a national stage filing under 35 U.S.C. § 371 of International Patent Application No. PCT/US2018/063140, titled "ELECTRICAL MULTIPLE STAGE VARIABLE FORCED AIR INDUCTION SYSTEM," filed Nov. 29, 2018, which claims priority to U.S. Provisional Patent Application No. 62/593,117, titled "ELECTRICAL MULTIPLE STAGE VARIABLE FORCED AIR INDUCTION," filed Nov. 30, 2017, and to U.S. Provisional Patent Application No. 62/668,681, titled "ELECTRIC MULTIPLE STAGE VARIABLE FORCED AIR INDUCTION SYSTEM," filed May 8, 2018. Each of the foregoing applications is hereby incorporated by reference in its entirety.

TECHNICAL FIELD

The present disclosure relates to forced air induction systems, and more particularly to systems for controlling the air intake of combustion engines.

BRIEF DESCRIPTION OF THE DRAWINGS

Non-limiting and non-exhaustive embodiments of the disclosure are described herein, including various embodiments of the disclosure with reference to the figures listed below.

Figure 1:
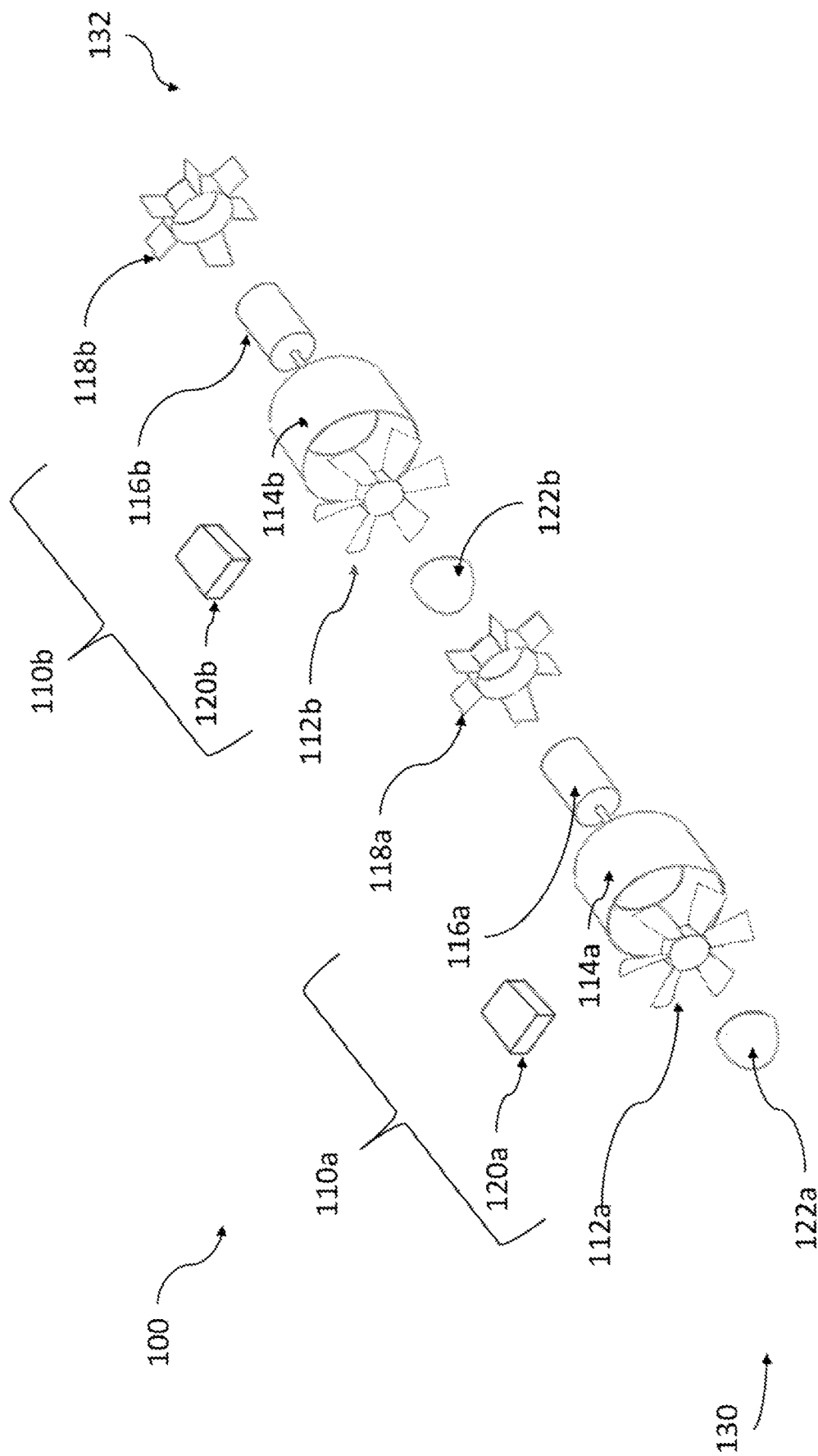
FIG. 1 is an exploded view of an electric multiple stage variable forced air induction system, according to one embodiment.

In the following description, numerous specific details are provided for a thorough understanding of the various embodiments disclosed herein. The systems and methods disclosed herein can be practiced without one or more of the specific details, or with other methods, components, materials, etc. In addition, in some cases, well-known structures, materials, or operations may not be shown or described in detail in order to avoid obscuring aspects of the disclosure. Furthermore, the described features, structures, or characteristics may be combined in any suitable manner in one or more alternative embodiments.

DETAILED DESCRIPTION

Combustion engines often comprise a combustion chamber where an air-fuel mixture may be ignited. In piston engines, a piston may be displaced due to the increased pressure after the combustion of the air-fuel mixture in the combustion chamber. Fuel may be injected into the combustion chamber, and air may be mixed with the fuel. If the air in the air-fuel mixture provides sufficient oxygen, the explosion may provide more power to the piston(s) per stroke, thereby increasing the efficiency of the engine.

The combustion chambers of naturally aspirated engines receive air for the air-fuel mixture due to atmospheric pressure acting against the partial vacuum that occurs as the piston(s) travels downwards toward bottom dead center during the induction stroke. The air pressure and the oxygen content in the combustion chamber are therefore at least partially attributable to the atmospheric pressure. Consequently, the efficiency of the engine may vary if the engine is operated at different altitudes, air temperatures, or barometric air pressures.

Forced air induction systems can be used to increase the air pressure (e.g., the static air pressure) within a combustion chamber, thereby reducing dependence on atmospheric pressure. Such systems may allow the air pressure within the combustion chamber to increase beyond the atmospheric pressure and thereby allow more oxygen to mix with the fuel. Forced air induction systems may increase the efficiency of the engine and possibly provide a more constant power output for the engine than natural aspiration regardless of the altitude of operation.

Turbochargers are one type of forced air induction system. Turbochargers may use the heat, pressure, and/or volumetric flow from exhaust gas as it exits the engine to pressurize intake air at the combustion chamber. Turbochargers generate a relatively high static air pressure at the engine air intake to enhance airflow into the combustion chamber. Specifically, the exhaust gas exiting the engine may be routed through a turbine housing of a turbocharger in a manner that causes an exhaust gas-driven turbine to spin within the housing. The exhaust gas-driven turbine may be coupled to one end of a shaft that is common to a radial air compressor, and the radial air compressor may be coupled at an opposite end of the shaft. Thus, rotary action of the exhaust gas-driven turbine may cause the air compressor to spin within a compressor housing of the turbocharger. The compressor housing may be separate from the exhaust housing. The spinning action of the air compressor may cause air to enter the compressor housing and be pressurized or boosted to a target level at the air intake of the engine before the air is mixed with fuel and combusted within the combustion chamber. In short, a turbocharger is designed to create a desired level of static air pressure at the air intake of the engine, which increases the amount of air that flows into the cylinders of the engine. The target level of static air pressure generated by the turbocharger is fixed and unalterable. That is to say, the target is fixed and the turbocharger operates to achieve that target level of static air pressure. The air pressure cannot be bled off (or released) from the intake to the external environment. The turbocharger does not allow backflow.

A turbocharger must be matched to a specific rotations per minute (RPM) range to function correctly. The target level of static air pressure corresponds to the functional range. Accordingly, a turbocharger configured for an upper end of an engine's RPM range will have reduced or limited effectiveness when the engine is operated at relatively low speeds. Similarly, a turbocharger matched for a lower end of an engine's RPM range can overspeed and possibly even explode (due to pressure build-up) as the engine surpasses the lower end range. Further, the turbocharger can over boost and cause severe engine damage.

The rotary action of the turbine of a turbocharger is dependent upon the heat and volumetric flow of exhaust gas exiting the engine. Stated differently, the variability of the compressor speed is not dependent on desired engine output, but rather based on volumetric flow of exhaust gas exiting the engine. As a result, turbo lag occurs while volumetric flow grows at the exit of the engine. Turbo lag is the time between a demand for an increase in power (the throttle being opened) and the turbocharger(s) providing increased power. Various efforts and improvements attempt to overcome turbo lag with marginal success.

Presently, there are electrically assisted turbochargers to reduce turbo lag. These electrical assists operate by charging a capacitor a high enough voltage to momentarily power a motor to turn the turbine while the volumetric flow of exhaust gas rises to a sufficient level. These turbochargers operate on same principles as outlined above, namely use of volumetric flow of exhaust gas to drive a compressor wheel that generates a target level of air pressure at the air intake of the engine.

Turbochargers typically include a turbine shaft and wheel and a centrifugal compressor wheel to pressurize the air intake of an engine. In a centrifugal compressor, the pressure of incoming air is increased by a compressor wheel, a series of blades mounted on a circular hub. The centrifugal compressor wheel moves air radially, i.e., the direction of the outward flowing air is changed, usually by 90°, from the direction of the incoming air. The airflow created by the centrifugal compressor is directed through a system of ducts or tubes. This helps create a higher air pressure. Centrifugal compressor wheels typically limit and even prevent backflow while the compressor wheel is turning.

Superchargers are another type of forced air induction system. Superchargers typically use mechanical movement within the engine to spin a compressor that may pressurize or boost the intake air to a desired level before it is mixed with fuel and combusted within the combustion chamber. Superchargers, like turbochargers, increase static air pressure at the engine air intake to enhance airflow into the combustion chamber. For example, a belt from the engine may be coupled to a shaft at a first end, where the shaft may be coupled to a compressor on another end. The compressor may be disposed within a compressor housing along the intake airway. When the belt spins, the compressor may pressurize or boost intake air to a desired level before it is mixed with fuel and combusted within the combustion chamber. The variability of the compressor speed is dependent on desired engine output, by mechanical movement of the belt or compressor driver.

Superchargers may include a centrifugal compressor wheel to pressurize the air intake of an engine, similar to a turbocharger. Superchargers may alternatively use a rotary-screw (worm-gear) compressor, which is a type of gas compressor that uses a rotary-type positive-displacement mechanism. Rotary-screw compressors use two meshing helical screws, known as rotors, to compress the air passing through. Air enters at the suction side and moves through the threads as the screws rotate. The meshing rotors force the air through the compressor, and the air exits at the end of the screws. Rotary-screw fans typically limit or even prevent backflow while the meshing rotors are operational. In other words, superchargers, like turbochargers, generate a relatively high static air pressure at the engine air intake to enhance airflow into the combustion chamber.

To drive a compressor of a turbocharger or supercharger using an electric motor would require significant voltage (e.g., minimum 48 volts) and a large electric motor (e.g., comparable to a starter motor). A principle of operation of turbochargers and superchargers is generation of relatively high static air pressure within a compressor housing at the engine air intake. Generating high static air pressure requires significant energy. Accordingly, significant challenges and obstacles are present to providing an electrically driven turbocharger or supercharger.

An electrically driven forced air induction system that can attempt to address some of the foregoing challenges may be desirable. The disclosed embodiments include electrically driven forced air induction systems for pressurizing and/or boosting the intake air before it is mixed with fuel and combusted within the combustion chamber. The herein disclosed electrically driven forced air induction systems use a motor to spin a turbine to enhance airflow and thereby increase dynamic air pressure at the engine air intake to increase the air that flows into the combustion chamber. Unlike turbochargers or superchargers, the disclosed electrically driven forced air induction systems may not depend on the current output of the engine (i.e., the volumetric flow of exhaust gas and/or mechanical movement of the engine). A motor of an electrically driven forced air induction system may be controlled by an intelligent electronic device (IED) (or a processing unit) to sense various parameters within the engine and spin a fan at a speed that enhances air flow, and thereby dynamic air pressure, to boost the air that flows in the combustion chamber to a desired level.

An electrically driven forced air induction system, according to the present disclosure, may include an axial fan (e.g., axial induction systems). An axial fan, named for the direction of the airflow created, includes blades rotating around an axis that draw air in from a direction parallel to the axis and force the air out in the same direction. The blades create a thrust force to drive or propel air in a direction parallel to that axis. The term thrust, as used herein, means to propel or drive air in a given direction to thereby generate airflow. Airflow, as used herein, refers to movement of a volume of air per unit of time. For example, an increase in airflow means an increased volume of air being moved per unit time.

An axial fan creates high airflow (air moving with a high flow rate), thereby displacing a large volume of air per unit time. However, the airflows that axial fans create are of low static air pressure. In other words, axial fans generally may not generate high static air pressure within a chamber. Moreover, axial fans may allow backflow. Backflow is the channeling of air in the direction opposite the chamber entrance between the fan blades and housing. Backflow may be caused by excess RPMs in the fan motor, misshaping of the intake manifold, changes in temperature within the intake manifold, the shaping of the axial compressor, the speed of the axial compressor, and/or various other factors. Backflow may reduce the volumetric flow of the intake air and thereby reduce pressure within the combustion chamber. Axial fans may also change the direction of the airflow along the axis of the axial fan, for example by changing from turning in a clockwise direction to turning in a counterclockwise direction (or vice versa).

The present disclosure provides systems and methods that determine a desired dynamic air pressure, airflow, or boost level within a combustion chamber of an engine, and utilize multiple stages of axial fans included in an electrically driven forced air induction system to achieve the desired dynamic air pressure, airflow to, and/or boost level within the combustion chamber. The usage of more than one axial fan in an electrically driven forced air induction system may allow for increased precision and speed of air being thrust through the electrically driven forced air induction system. In other words, the usage of more than one axial fan may allow for enhanced control of airflow to an engine air intake, providing greater control of air provided to a combustion chamber of an engine. The disclosed embodiments may utilize a plurality of axial fans that are controlled by independent motors, where the motors may be controlled by independent processes and/or independent IEDs.

In some embodiments, the usage of more than one fan may control or limit backflow. The use of more than one axial fan may decrease backflow (e.g., the thrust generated by a first fan can work to counteract the backflow of the second fan, or vice versa), thus increasing airflow to the air intake of the engine in a manner that is not available with single axial ducted fan intakes.

In addition, the presently disclosed embodiments may allow reversal of the motors spinning the axial fans to thereby reverse the thrust forces on an airflow, drawing air away from the air intake, and thereby creating the effect that a throttle has been closed by starving the engine of air in the air-fuel mixture. This is effective in motors or engines that have no throttle plates (e.g., diesel engines). This reversal of the airflow to a direction away from the air intake may effectively slow the engine down without needing to use an engine brake or throttle control.

In other embodiments, the usage of more than one axial fan may allow for fine tuning of airflow to the intake and/or boosting at a wide range of RPMs. For example, where multiple fans are used, a first fan may provide a level of thrust on an airflow that is suitable for high RPMs while a second (and/or additional) fan(s) may provide a level of thrust on an airflow that is suitable for low RPMs. As discussed in detail relative to embodiments herein, multiple stages of blade configuration, size, pitch, speed, and direction can achieve different results, more efficiency, and less power draw.

In addition, the presently disclosed embodiments may include one or more stators configured to physically interact with a flow of air through an electrically driven forced air induction system. These stators may allow for increased precision and speed of an airflow, and may further be configured for funneling and/or straightening an airflow for desired effects. For example, the angle of attack, length, pitch, and/or materials of the stator(s) may be configured for additional tuning, efficiency, and less system-wide power draw.

In addition, the shape, size, diameter, and circumference of the housing at different portions of the housing can allow for control of the speed of the airflow. By creating a larger or smaller diameter in various parts of the housing, the airflow can be slowed or increased, thus creating a more efficient control of the airflow into the one or more axial fans and/or the engine air intake.

Additional details and examples are provided with reference to the figures below. Generally speaking, the systems and methods disclosed herein may be adapted to interface with or be included as part of an engine or engine element.

The phrases "connected to" and "in communication with" refer to any form of interaction between two or more components, including mechanical, electrical, magnetic, and electromagnetic interaction. Two components may be connected to each other, even though they are not in direct contact with each other, and even though there may be intermediary devices between the two components.

As used herein, the term IED may refer to any appropriate computing device, which may include a processor, a microprocessor, a microcontroller, logic circuitry, or the like. The IED may include a special-purpose processing device, such as an Application-Specific Integrated Circuit (ASIC), a Programmable Array Logic (PAL), a Programmable Logic Array (PLA), a Programmable Logic Device (PLD), a Complex Programmable Logic Device (CPLD), a Field Programmable Gate Array (FPGA), or other customized or programmable device. The IED may also include a computer-readable storage device, such as non-volatile memory, static Random Access Memory (RAM), dynamic RAM, Read Only Memory (ROM), flash memory, or other computer-readable storage medium. The term IED may be used interchangeably to describe an individual IED or a system comprising multiple IEDs.

Aspects of certain embodiments described herein may be implemented as software modules or components. As used herein, a software module or component may include any type of computer instruction or computer-executable code located within or on a computer-readable storage medium, such as a non-transitory computer-readable medium. A software module may, for instance, comprise one or more physical or logical blocks of computer instructions, which may be organized as a routine, program, object, component, data structure, etc., that perform one or more tasks or implement particular data types, algorithms, and/or methods.

A particular software module may comprise disparate instructions stored in different locations of a computer-readable storage medium, which together implement the described functionality of the module. Indeed, a module may comprise a single instruction or many instructions, and may be distributed over several different code segments, among different programs, and across several computer-readable storage media. Some embodiments may be practiced in a distributed computing environment where tasks are performed by a remote processing device linked through a communications network. In a distributed computing environment, software modules may be located in local and/or remote computer-readable storage media. In addition, data being tied or rendered together in a database record may be resident in the same computer-readable storage medium, or across several computer-readable storage media, and may be linked together in fields of a record in a database across a network.

The embodiments of the disclosure can be understood by reference to the drawings, wherein like parts are designated by like numerals throughout. The components of the disclosed embodiments, as generally described and illustrated in the figures herein, could be arranged and designed in a wide variety of different configurations. Thus, the following detailed description of the embodiments of the systems and methods of the disclosure is not intended to limit the scope of the disclosure, as claimed, but is merely representative of possible embodiments.

FIG. 1 is an exploded view of an electric multiple stage variable forced air induction system 100, according to one embodiment. In various embodiments, the electric multiple stage variable forced air induction system 100 may be used to enhance airflow to or boost (or decrease) intake air for a combustion engine. The electric multiple stage variable forced air induction system 100 can generate one or more thrust forces on an airflow to the air intake and/or the combustion chamber of a combustion engine. In such embodiments, intake air may enter the electric multiple stage variable forced air induction system 100 at a first end 130 and exit at a second end 132. Once intake air exits the electric multiple stage variable forced air induction system 100, it may enter an intake manifold or combustion chamber of a combustion engine. The intake air may exit the electric multiple stage variable forced air induction system 100 with a higher dynamic air pressure than may occur without the electric multiple stage variable forced air induction system 100.

Figure 2:
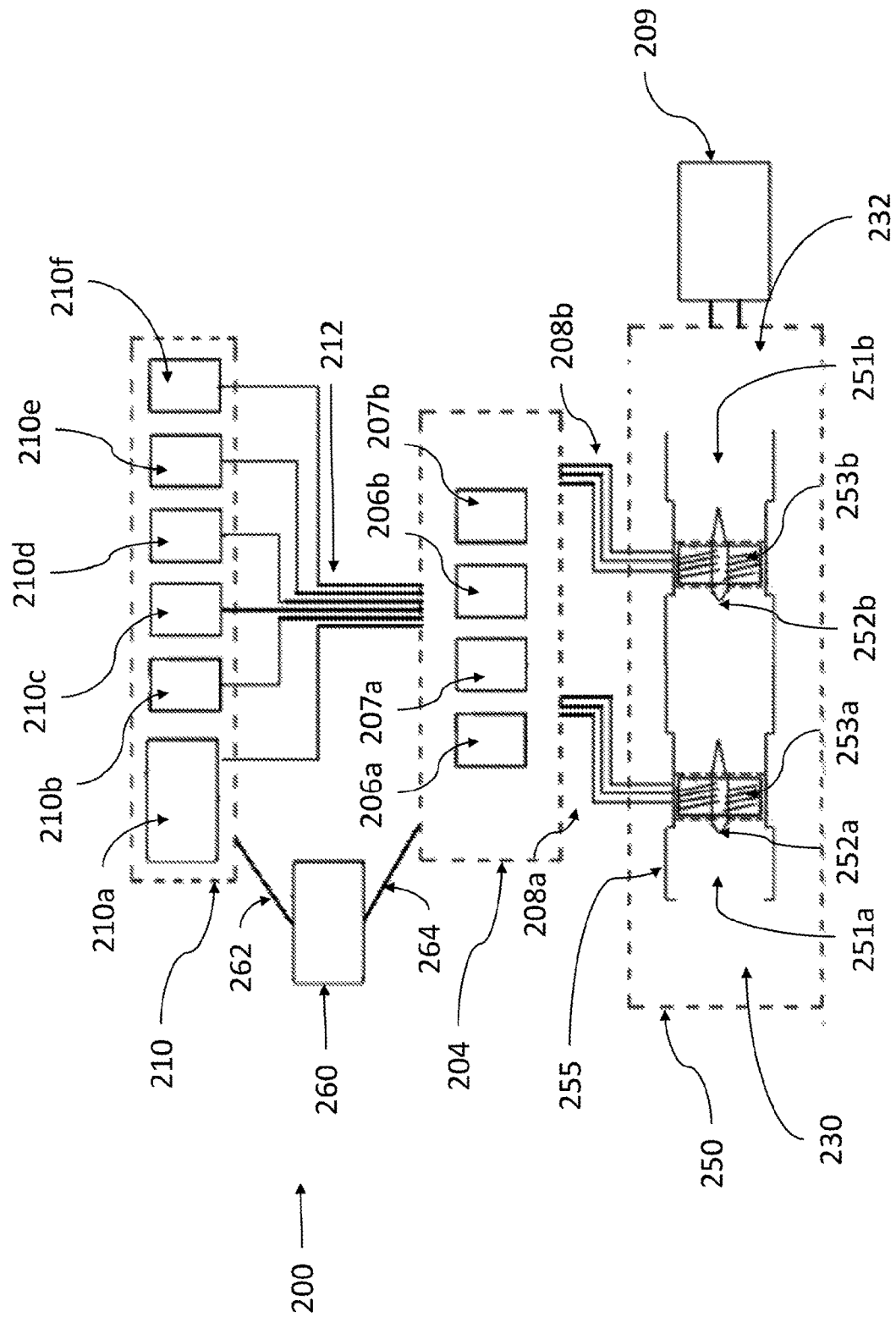
FIG. 2 is a block diagram of an electric multiple stage variable forced air induction system, according to one embodiment.

A first stage 110a and a second stage 110b (collectively stages 110) of an electric multiple stage variable forced air induction system 100 are shown in FIG. 1. Each stage 110a, 110b may comprise first and second turbine rotors 112a, 112b (collectively turbine rotors 112), turbine housing components 114a, 114b (collectively turbine housing components 114), first and second motors 116a, 116b (collectively motors 116), first and second stator/motor supports 118a, 118b (collectively stators/motor supports 118), first and second processors 120a, 120b (collectively processors 120), and a front rotor cone 122a, 122b (collectively front rotor cones 122). The turbine housing components 114 may be each irremovably integrated into the same single turbine housing for the entire system (as shown in FIG. 2).

In various embodiments, the turbine rotors 112 may be disposed at the interior of the turbine housing components 114 respectively. Further, the motors 116 may respectively be coupled to the turbine rotors 112 via an axle or other appropriate mechanism. This coupling may allow the motors 116 to turn the turbine rotors 112 according to a speed and direction of the motors 116. The motors 116 may be disposed at the interior of the turbine housing components 114 respectively and may be supported therein by the stators/motor supports 118. The stators 118 may each be configured to physically interact with the air flowing through the electric multiple stage variable forced air induction system 100. The stators 118 may allow for increased precision and speed of an airflow, and may further be configured for funneling and/or straightening an airflow for desired effects. For example, the angle of attack, the length, pitch, and/or materials of the stators 118 may be configured for additional tuning, efficiency and less system-wide power draw. The first stator 118a may be configured differently than the second stator 118b.

The processors 120 may couple to the motors 116 via wires (not shown) and control and/or drive the motors 116. The front rotor cones 122 may be coupled respectively to the turbine rotors 112. The motors 116 may be configured to turn the turbine rotors 112 in either a clockwise direction or a counterclockwise direction, which may enable the turbine rotors 112 to generate a thrust in either direction along an axis of each respective rotor on an airflow. The processors 120 and motors 116 may draw power from an outside source (e.g., the battery of a vehicle in which the electric multiple stage variable forced air induction system 100 is installed).

An airflow may include air entering the electric multiple stage variable forced air induction system 100 at the first end 130 of the electric multiple stage variable forced air induction system 100. From the first end 130, the airflow may proceed to the first stage 110a. The first turbine rotor 112a of the first stage 110a may be rotated by the first motor 116a to generate a thrust on the airflow in a direction parallel to an axis about which the first turbine rotor 112a rotates. The airflow may then proceed to the second stage 110b. The second turbine rotor 112b of the second stage 110b may be rotated by the second motor 116b to generate a thrust on the airflow in a direction parallel to an axis about which the second turbine rotor 112b rotates. The airflow may then proceed to the second end 132 of the electric multiple stage variable forced air induction system 100. In some embodiments, this airflow may be reversed by reversing the rotation of one or more of the turbine rotors 112.

In various embodiments, the processors 120 may be programmed to control the motors 116, in turn to control the turbine rotors 112, according to a predetermined mapping of events. Each of the processors 120 may be a "control device" as that term is used herein. The processors 120 may receive, as inputs, data from external sensors (not shown) that detect information (e.g., engine parameters) regarding operating conditions of the combustion engine. These engine parameters may include the desired engine output, the current engine output, a current air pressure (e.g., static air pressure, dynamic air pressure, total air pressure) in the intake manifold, the current pressure in the combustion chamber, the atmospheric pressure, the throttle position, the airflow at the intake manifold, the temperature within the intake manifold, the fuel content within the combustion chamber, the atmospheric pressure, and/or other relevant engine parameters.

In some embodiments, if the current engine output is not equal to the desired engine output, the processors 120 may further determine the amount of airflow that is desired for the engine to output the desired amount of power. In the case that a change in airflow amount is required, the processors 120 may calculate one or more speeds and directions for the one or more of the motors 116 for which a desired airflow will be generated, and issue commands, or otherwise signal, to the motors 116 to spin the turbine rotors 112 at those respective speeds and directions such that the intake air is thrust into (or away from) the air intake of the engine at the desired airflow rate to cause the engine to operate with the desired amount of power. A similar method according to embodiments herein may compare an actual airflow to a desired airflow. The processors 120 may then calculate speeds and directions for one or more of the motors 116 to spin the turbine rotors 112 at those respective speeds and directions such that the air is thrust into the air intake of the engine at the desired air flow rate.

In other embodiments, the processors 120 may determine an appropriate command or signal to send to the motors 116 to control their respective speeds and directions using mappings corresponding to sensor data other than airflow sensor data and/or engine output sensor data. For example, the processors 120 my use a mapping of events corresponding to sensor data indicating the current position of a throttle to calculate speeds and directions at which to operate motors 116 to spin the turbine rotors 112.

In some embodiments, a mapping of events includes locating a predetermined instruction or instructions to issue to the motors 116 based on a lookup function using the data received from one or more external sensors. In some embodiments, a mapping of events may include generating an instruction or instructions to send to the motors 116 corresponding to a real-time calculation performed on the data received from one or more external sensors.

In various embodiments, the concurrent use of multiple stages of an electric multiple stage variable forced air induction system (such as the stages 110 of the electric multiple stage variable forced air induction system 100 of FIG. 1) may allow for a greater range and/or a greater precision of airflow to boost air intake than what can be provided by a system that has only a single stage. For example, the first stage 110a may be controlled independently from the second stage 110b (and likewise independently from any additional stages) such that the first stage 110a varies the intake airflow when the engine is operated at low RPMs and the second stage 110b (and/or any additional stages) varies the intake airflow when the engine is operated at high RPMs. In various embodiments, if the engine is operating at a midrange between relatively low and high RPMs, multiple stages 110 may operate simultaneously to generate desired air flow. Alternatively, the first stage 110a may vary the intake airflow when the engine is operated at high RPMs and the second stage 110b varies the intake airflow when the engine is operated at low RPMs. The speed of rotation (e.g., RPMs) of the first turbine rotor 112a of the first stage 110a may be different from the speed of rotation of the second turbine rotor 112b of the second stage 110b, which may increase, decrease, or otherwise enhance airflow into the intake of the engine.

For example, in certain embodiments, the stages 110 may be used to modify the airflow beyond what a single stage 110 would be able to produce. For example, the second stage 110b may be used to generate a thrust of a first magnitude on the airflow, and the first stage 110a may be used to generate a thrust of a second magnitude on the airflow, where the magnitude of the combined thrusts is greater than the magnitude of either of the first or second thrusts. In some embodiments, one stage (for example the second stage 110b) may be used to increase flow of the intake air, while another stage (for example the first stage 110a) may be used to control or reduce backflow.

In some embodiments, the processors 120 may determine that the desired engine output is lower than the current engine output. In such embodiments, the processors 120 may issue commands, or otherwise signal, to one or more of the motors 116 to spin one or more of the turbine rotors 112 in a direction that pushes the air from the second end 132 of the electric multiple stage variable forced air induction system 100, towards the first end 130 of the electric multiple stage variable forced air induction system 100. In forcing air away from the combustion chamber of the engine, the engine may not have sufficient oxygen in the chamber to produce much horsepower and the engine output may decrease. In some embodiments, using multiple stages to push air away from the combustion chamber of the engine may produce and/or enhance an engine braking effect.

Embodiments where the processors 120 issue commands or signals in other ways are also contemplated. For example, the processors 120 may issue commands, or otherwise signal, to one of the motors (e.g., the first motor 116a) to spin the first turbine rotor 112a and may issue commands, or otherwise signal, to the other of the motors (e.g., the second motor 116b) to remain still (therefore not causing the second turbine rotor 112b to spin, or even preventing the second turbine rotor 112b from spinning), or even to spin the second motor 116b in the opposite direction from the first motor 116a, causing the second turbine rotor 112b to spin at a different direction from the first turbine rotor 112a. Each motor 116 may be controlled independently of the other motor.

The blades on the turbine rotors 112 can be tuned a variety of ways to configure the amount of thrust exerted by the turbine rotors 112 on an airflow. In some embodiments, the first turbine rotor 112a may have blades that are any one or more of a different size, blade profile, diameter, pitch, composites, materials, and/or shape than the blades of the second turbine rotor 112b. The blades on the turbine rotors 112 may be tuned the same way, or they may be tuned differently from each other.

Additionally, different respective sizes for the motors 116 and/or different respective configurations of the motors 116 can yield desired results and the ability to strategically turn them off as needed for efficient power consumption. For example, if only a small effect (or contribution of thrust) on the airflow is needed, and if the first motor 116a is smaller than the second motor 116b, the system may utilize the first motor 116a instead of the second motor 116b to generate the needed effect. The fact that the first motor 116a is smaller than the second motor 116b may mean that choosing the first motor 116a led to less power usage than if the second motor 116b had been chosen. Another example might be running either one or multiple motors at different stages for efficient airflow requirements. In other embodiments, more stages may be added to produce greater and/or enhanced airflow capabilities, greater precision, and/or greater backflow control.

The turbine rotors 112 may function as axial fans, producing, increasing, and/or decreasing or otherwise enhancing airflow out in the same direction the air is received into the turbine rotors 112. The turbine rotors 112 enhance airflow at the air intake of the engine in an open environment, without a sealed compression chamber. Different from presently available forced air induction systems (e.g., turbochargers, superchargers) that require a build-up of pressure in an isolated (or sealed) compression changer (e.g., the air intake), the turbine rotors 112 may increase pressurization in an unisolated space and allow backflow (flow of air in a reverse direction from airflow produced and output by rotation of the turbine rotors 112) and through flow (airflow through the turbine rotors 112 when the turbine rotors 112 are not rotating). As a result, the electric multiple stage variable forced air induction system 100 is less invasive within the conduit (e.g., intake tube). The electric multiple stage variable forced air induction system 100 can actively control the turbine rotors 112 within the conduit between the air filter and the intake of the engine.

In some embodiments, a single processor may be used in the place of two or more processors 120. For example, a single processor may be used to receive data from various parts of the engine and to control both motors 116. Further, it may be possible for a single processor to issue identical commands to both turbine rotors 112. Alternatively, a single processor may issue independent commands to both turbine rotors 112.

FIG. 2 is a block diagram of an electric multiple stage variable forced air induction system 200, according to one embodiment. The electric multiple stage variable forced air induction system 200 may comprise an electric multiple stage variable forced air turbine 250, a forced air turbine control system 204, and forced air turbine sensors 210. The electric multiple stage variable forced air induction system 200 produces airflow to increase, decrease, enhance, and/or boost intake air to an air intake manifold 209 of a combustion engine. In such embodiments, intake air may enter the electric multiple stage variable forced air induction system 200 at a first end 230 and exit at a second end 232. The first end 230 and the second end 232 may be located on the electric multiple stage variable forced air turbine 250. Once intake air exits the electric multiple stage variable forced air induction system 200, it may be thrust into the intake manifold 209 or combustion chamber of the combustion engine.

The electric multiple stage variable forced air turbine 250 may comprise a turbine housing 255, where a first stage 251a and a second stage 251b (collectively stages 251) are disposed at the interior of the turbine housing 255. According to the embodiment of FIG. 2, the first stage 251a and the second stage 251b may respectively comprise a first turbine rotor 253a and a second turbine rotor 253b (collectively turbine rotors 253) and may further respectively comprise a first motor 252a and a second motor 252b (collectively motors 252). In various embodiments, the electric multiple stage variable forced air turbine 250 of FIG. 2 may be substantially similar to the electric multiple stage variable forced air induction system 100 of FIG. 1.

The forced air turbine control system 204 may comprise at least a first processor 206a. The forced air turbine control system 204 may instead comprise two or more processors, for example the first processor 206a and a second processor 206b (sometimes referred to collectively herein as processors 206). In some embodiments, a single processor (e.g., first processor 206a) may control both motors 252. In other embodiments, the forced air turbine control system 204 may control the first motor 252a with a first processor 206a and the second motor 252b with a second processor 206b. These processors may be configured to control the motors 252 directly (e.g., the processors 120 of FIG. 1).

In other embodiments, the processors 206 may be configured to control the motors 252 by sending instruction signals to a first motor controller 207a and a second motor controller 207b (collectively, motor controllers 207) included in the forced air turbine control system 204. Each motor controller 207 may receive instructions from one or more of the processors 206. For example, the first motor controller 207a may directly control the first motor 252a by taking instructions for how to do so from the first processor 206a. Similarly, the second motor controller 207b may directly control the second motor 252b by taking instructions for how to do so from the second processor 206b.

As used herein, the term "control device" may be a device including any number of processors. The term "control device" may further be a device including any number (including zero) of motor controllers. For example, a "control device" may be a single processor that is configured to receive sensor inputs and directly provide control signals for one or more motors of an electric multiple stage variable forced air induction system. Alternatively, a "control device" may be comprised of both a processor and a motor controller. In these embodiments, it may be that the processor is configured to receive sensor inputs, perform calculations using those inputs to generate instructions for controlling a motor, and communicate those instructions to a motor controller, while the motor controller is configured to receive those instructions and directly control the motor. The processor and the controller in these embodiments may be integrated into a single computer chip. A "control device" may further include any number of processor(s) and motor controller(s) that can jointly perform motor control functions, whether or not those processor(s) and motor controller(s) are integrated into the same computer chip. A forced air turbine control system 204 may therefore include one or more control devices.

The forced air turbine sensors 210 may comprise a first sensor 210a, a second sensor 210b, a third sensor 210c, a fourth sensor 210d, a fifth sensor 210e, and a sixth sensor 210f.

In various embodiments, the motors 252 may be coupled to the turbine rotors 253 respectively via axles or some other suitable mechanical mechanism. Further, the forced air turbine control system 204 may be coupled to the motors 252 via one or more wires 208. Specifically, the forced air turbine control system 204 may be coupled to the first motor 252a of the first stage 251a via a first set of wires 208a, and to the second motor 252b of the second stage 251b via a second set of wires 208b.

The sensors 210 may each be coupled to the forced air turbine control system 204 (e.g., to the processor(s)) via wires 212. The sensors 210 may provide data to the forced air turbine control system 204 in an analog format, a digital format, or both. Alternatively, data from the sensors 210 may be provided to the forced air turbine control system 204 indirectly in an analog or digital format from an outside system (e.g., from a Controller Area Network (CAN) bus of a vehicle using an On-Board Diagnostics (OBD)-II system).

The sensors 210 may sense various parameters of the engine. For example, the first sensor 210a may sense the throttle position. The second sensor 210b may sense an air pressure (e.g., static air pressure, dynamic air pressure, total air pressure) at the intake manifold 209. The third sensor 210c may sense an air pressure in the combustion chamber(s) of the engine. The fourth sensor 210d may sense the airflow (movement of volume of air per unit time) in the intake manifold 209. The fifth sensor 210e may sense the temperature within the intake manifold 209. The sixth sensor 210f may sense the fuel content within the combustion chamber. In various embodiments, various sensors 210 may be excluded from the group of sensors 210. In other embodiments, additional sensors may be included in the group of sensors 210. For example, sensors for atmospheric pressure, the desired engine output, the current engine output, and/or other relevant parameters may be included in the group of sensors 210.

The forced air turbine control system 204 (e.g., the processor(s)) may receive data from the sensors 210 and determine a target airflow based on the data. The target airflow may be a desired airflow into the intake manifold 209 or combustion chamber. The forced air turbine control system 204 may further determine one or more speeds and/or directions at which the turbine rotors 253 may need to spin in order to achieve the target airflow. It may alternatively be that the forced air turbine control system 204 is configured to directly calculate an appropriate speed and/or direction for one or more turbine rotors 253 based on the data from the sensors 210 (thereby implicitly considering target airflow considerations). Once a speed and direction are determined, the forced air turbine control system 204 may issue signals to the motors 252 configured to cause the motors 252 to spin the turbine rotors 253 at the desired speed and direction.

For example, the forced air turbine control system 204 may be connected to a Throttle Position Sensor (TPS) 210a of a vehicle with a combustion engine that is coupled to the electric multiple stage variable forced air induction system 200. The TPS may provide an analog voltage value corresponding to, or otherwise indicate, the current throttle position of the combustion engine. One or more of the processors 206 of the forced air turbine control system 204 may then take this analog value as an input and convert it to a corresponding numerical parameter useful for calculating a motor control speed.

A numerical parameter may be calculated in a linear fashion based on the known range of the possible voltages from the input sensor. For example, the numerical parameter may be calculated linearly within the range of 0-1023, with 0 corresponding to 0 volts from the input sensor and 1023 corresponding to 5 volts from the input sensor.

It may be that the forced air turbine control system 204 further comprises one or more motor controllers 207 configured to control the speed of the motors 252 attached to turbine rotors 253 based on a Pulse Width Modulation (PWM) signal that ranges between 1 ms (motor off) and 2 ms (motor at full speed) in width. Other reasonable pulse widths are contemplated. Certain embodiments of the forced air turbine control system 204 may therefore use one or more of the processors 206 to generate a PWM signal for one or more of the motor controllers 207 that scales from 1 ms to 2 ms (with 1 ms being an unmodified default) according to changes in the numerical parameter calculated from the TPS signal. This scaling may be linear, or it may be based on non-linear formulas. The one or more processors 206 of the forced air turbine control system 204 may use the calculated numerical parameter to calculate a pulse width of a motor control signal provided to one or more of the motor controllers 207 in various innovative ways.

For example, it may be understood that during normal operation, the TPS may not be expected to return a value on the extreme ends of the nominal voltage range in which it can theoretically operate. For example, a TPS may be configured to use voltages ranging from 0.7 to 4.2 volts during regular use of the throttle. One or more of the processors 206 may thus correspondingly be configured to modify PWMs for one or more of the motor controllers 207 for a modified parameter range between 143 and 860 (with each value respectively corresponding (after rounding) to 0.7 and 4.2 volts on a linear scale of 0-5 volts broken up between 0-1023, e.g., where 0.7/5*1023 is about 143 and where 4.2/5*1023 is about 860). If it becomes clear during operation that the TPS is reporting a voltage lower than 0.7 or a voltage higher than 4.2 during normal operation, the corresponding modified parameter range for which the generated PWMs for the one or more motor controllers 207 may be affected may be re-calculated in real time or perhaps some amount of time later.

Some embodiments of the one or more processors 206 of a forced air turbine control system 204 may be configured to not modify the PWMs for the one or more motor controllers 207 until the calculated numerical parameter is above the bottom of the modified parameter range by a minimum band amount. For example, if the bottom of the modified parameter range (calculated as described above) is 143, one or more of the processors 206 may be further configured to only modify the PWMs for one or more of the motor controllers 207 once the calculated numerical parameter corresponding to the TPS signal reaches, e.g., a band amount of 6+the bottom of the modified parameter range 143 (for a total value of 149). This may prevent the system from being too sensitive to small fluctuations on the TPS that may occur when the throttle is actually closed and no modification of the PWMs for the motor controllers 207 should be occurring. It may be, however, that once a numerical parameter greater than or equal to 149 is calculated, the system makes further mathematical determinations for modifying the PWMs based on the bottom of the modified parameter range (143).

In some embodiments, one or more of the processors 206 may generate a PWM signal for one or more of the motor controllers 207 that grows linearly across the entire modified parameter range (e.g., that grows linearly from 1 ms to 2 ms as the calculated numerical parameter increases from 143 to 860). Other embodiments may instead generate a PWM signal that grows linearly across only a subset of the modified parameter range, and has an assigned PWM signal corresponding to the rest of the range (e.g., a PWM signal that grows linearly from 1 ms to 2 ms across the first 75% of the modified parameter range (from 143 to about 681), with an assigned 2 ms (full) pulse length for all values from 682 to 860).

In other embodiments, one or more of the processors 206 may use any of the above described methods with a "boost" value incorporated into the calculated numerical parameter. For instance, the calculated numerical parameter may be "boosted" by a given amount prior to using the calculated numerical parameter to further determine a corresponding PWM signal for one or more of the motor controllers 207.

As an example, if a calculated numerical parameter is 149, it may be "boosted" by, e.g., 40 to a value of 189. This value of 189 may be what is then used in the generation of the PWM signal according to the placement within the modified parameter range, as described above. It may be that this "boost" value is only applied to the calculated numerical parameter once the calculated numerical parameter reaches a value above any minimum band amount. The use of a "boost" value by one or more of the processors 206 may cause a different (e.g., increased) airflow into the intake manifold 209 than would have occurred without using a "boost" value.

The previous examples involving TPS-driven PWM signal generation methods are given by way of example and not by way of limitation. Persons with ordinary skill in the art will recognize that one or more of the processors 206 of the forced air turbine control system 204 may perform calculations in response to any other sensor 210 (other than a TPS sensor) that is reporting values to the forced air turbine control system 204. The calculations may be similar to or distinct from the calculations performed based on TPS-driven values. Further, persons with ordinary skill in the art will recognize that similar principles may be used to generate, e.g., a scaled voltage (or current) for one or more of the motor controllers 207 that requires a voltage (or current) as an input instead of a PWM signal. Persons with ordinary skill in the art will also recognize that ranges for values such as, e.g., voltage ranges for sensors, maximum parameter ranges corresponding to sensor voltage ranges, modified parameter ranges, and/or ranges given for possible pulse widths may be varied while still adhering to the described principles. Further, persons with ordinary skill in the art will recognize that any combination of data from sensors 210 may be used in combination and with various mathematical formulae to determine a signal for one or more of the motor controllers 207.

In some embodiments, the forced air turbine control system 204 may receive, as sensor inputs, reported values corresponding to the various sensors 210 rather than receiving direct readings from the sensors themselves as sensor inputs. For example, one or more of the sensors 210 may interface directly with an Electronic Control Unit (ECU) 260 over an interface wire (or an interface bus) 262. A value corresponding to the sensor reading at the ECU 260 may then be reported by the ECU 260 on a CAN bus 264. The forced air turbine control system 204 may use this reported value instead of or in addition to a direct reading from a sensor 210. This may be useful in (but is not limited to) cases where a vehicle lacks, e.g., a traditional TPS (as in some vehicles with diesel engines) and/or where the throttle position is otherwise reported on the CAN bus 264 by another sensor 210 or by some other method. A vehicle may have any number of sensors 210 (or any other sensor) interface with one or more ECUs, with any and/or each of the one or more ECUs capable of reporting values corresponding to readings from those sensors on the CAN bus 264.

Persons with regular skill in the art will recognize that any method used by the forced air turbine control system 204 may use reported values from the CAN bus 264 instead or in addition to direct readings from the sensors 210. A reported value from the CAN bus 264 may be used as the numerical parameter in the methods given above, or it may be that the reported value from the CAN bus 264 (rather than a direct reading from, e.g., the TPS) is further converted into a numerical parameter for use in the methods described above.

In some embodiments, the forced air turbine control system 204 may issue commands to both the first motor 252a and the second motor 252b. In some embodiments, the forced air turbine control system 204 may control the motors independently. In other embodiments, the forced air turbine control system 204 may control both motors 252 identically and/or collectively.

Intake air may enter the electric multiple stage variable forced air turbine 250 at the first end 230 and exit at the second end 232. Once the intake air enters the electric multiple stage variable forced air turbine 250, the first turbine rotor 253a of the first stage 251a may generate a thrust force on the intake air to propel an airflow. The intake air may then be directed to the second stage 251b where the second turbine rotor 253b may generate a thrust force on the intake air to further propel the airflow. The intake air may then be directed to the intake manifold 209 or combustion chamber of an engine. In this manner, the turbine rotors 253 produce and/or increase or otherwise enhance airflow. Stated otherwise, the thrust forces(s) of the first stage 251a and the second stage 251b propel the airflow to pressurize the intake air at the intake manifold 209 or combustion chamber of an engine.

In various embodiments, the concurrent use of multiple stages of an electric multiple stage variable forced air induction system (such as the stages 251 of the electric multiple stage variable forced air turbine 250 of FIG. 2) may allow for a greater range and/or a greater precision of air pressurization or boost than what can be provided by a system that includes only a single stage. For example, the first stage 251a may be controlled independently from the second stage 251b such that the first stage 251a varies the intake air pressure when the engine is operated at low RPMs and the second stage 251b varies the intake air pressure when the engine is operated at high RPMs. In some of these embodiments, it may be that only the first stage 251a is actively being used while the second stage 251b is in an idle state, or vice versa.

In other embodiments, if the engine is operating at a midrange between relatively low and high RPMs, both stages 251 may operate simultaneously within a pressure band. Alternatively, the first stage 251a may vary the intake air pressure when the engine is operated at high RPMs and the second stage 251b varies the intake air pressure when the engine is operated at low RPMs.

In other embodiments, the stages 251 may be used to step the dynamic air pressure beyond what the first stage 251a or the second stage 251b would be able to produce alone. For example, the first stage 251a may contribute to the airflow of the intake air with a thrust of a first magnitude, and the second stage 251b may contribute to the airflow of the intake air with a thrust of a second magnitude, where the second magnitude is greater than the first magnitude. In some embodiments, one stage (for example the second stage 251b) may be primarily used to contribute to the airflow of the intake air, while another stage (for example the first stage 251a) may be primarily used to control or reduce backflow from the second stage 251b.

In other embodiments, the first processor 206a may determine that the desired engine output is lower than the current engine output. In such embodiments, the first processor 206a may issue commands to the motors 252 to spin one or more of the turbine rotors 253 in a direction that pushes the air from the second end 232 of the electric multiple stage variable forced air turbine 250 towards the first end 230 of the electric multiple stage variable forced air turbine 250. In forcing air away from the combustion chamber of the engine, the engine may not have sufficient oxygen in the chamber to produce much horsepower and the engine output may decrease. In some embodiments, using the two stages to push air away from the combustion chamber of the engine may produce an effect similar to engine brakes.

The blades on the turbine rotors 253 can be tuned a variety of ways to configure the amount of thrust they place on an airflow generated by the turbine rotors 253. In some embodiments, the first turbine rotor 253a may have blades that are any one or more of a different size, blade profile, diameter, pitch, composite, material, and/or shape than the blades of the second turbine rotor 253b. Additionally, different size motors and configurations can yield desired results and the ability to turn them off as needed for efficient power consumption. Another example might be running either one or multiple motors at different stages for efficient airflow requirements. In other embodiments, more stages may be added to produce greater and/or enhanced airflow capabilities, greater precision, and/or greater backflow control.

Figure 3:
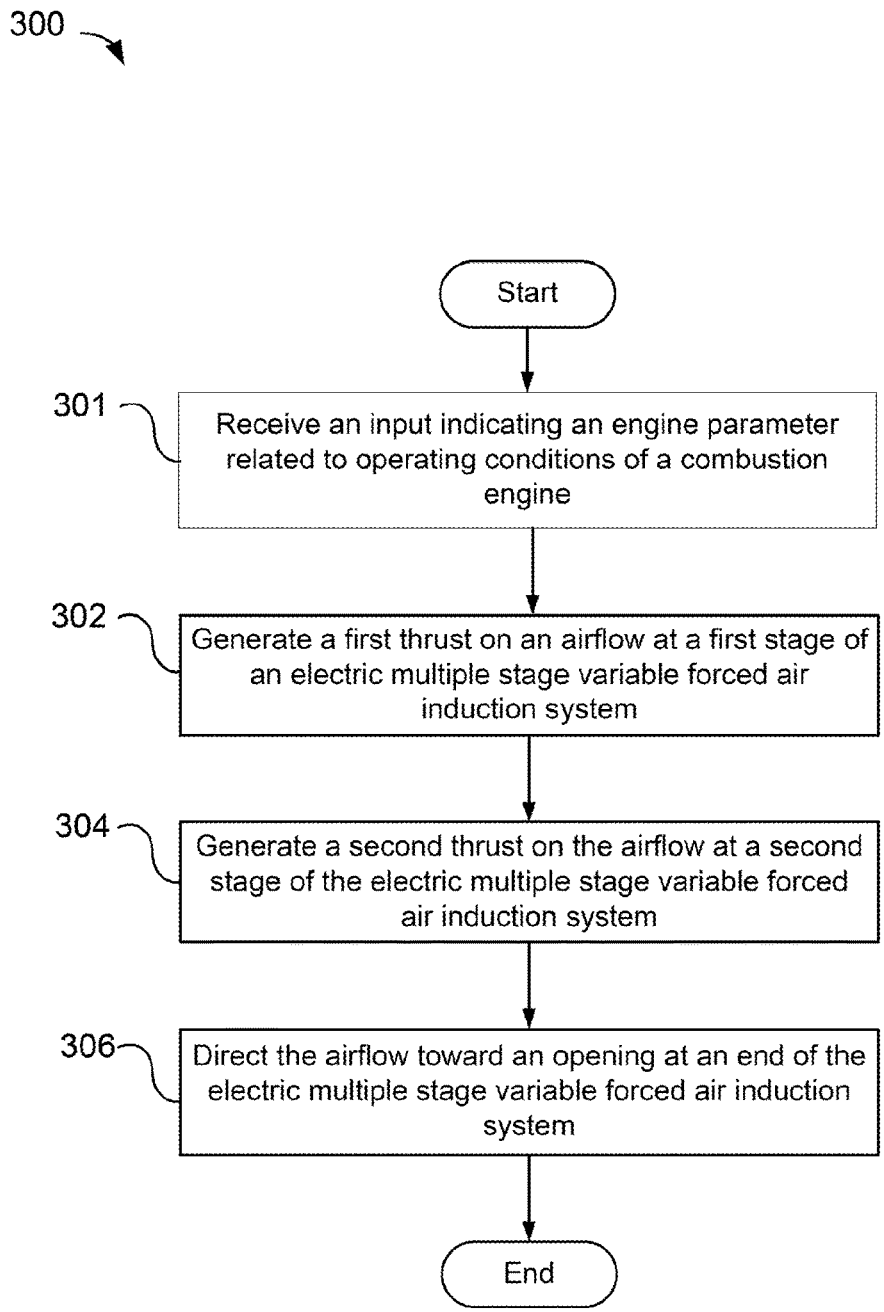
FIG. 3 is a flow diagram of a method for forced air induction of a combustion engine, according to one embodiment of an electric multiple stage variable forced air induction system.

FIG. 3 is a flow diagram of a method 300 for forced air induction of a combustion engine, according to one embodiment of the present disclosure. The method 300 may be performed by an embodiment of an electric multiple stage variable forced air induction system. The electric multiple stage variable forced air induction system implementing the method 300 may include two or more stages coupled together. The electric multiple stage variable forced air induction system may further include a plurality of ends. These ends may include an input end and an output end. The output end may be coupled to and in fluid communication with an intake of the combustion engine.

The method 300 includes receiving 301 an input indicating an engine parameter related to the operating conditions of a combustion engine. The engine parameters indicated by the input may include the desired engine output, the current engine output, a current air pressure (e.g., static air pressure, dynamic air pressure, total air pressure) in the intake manifold, the current pressure in the combustion chamber, the atmospheric pressure, the throttle position, the airflow at the intake manifold, the temperature within the intake manifold, the fuel content within the combustion chamber, the atmospheric pressure, and/or other relevant engine parameters. The input may be provided by a sensor and received at a processor. The input may be received at a forced air turbine control system of an electric multiple stage variable forced air induction system that includes the processor. The input in this case may be provided by one or more sensors coupled to the forced air turbine control system.

The method 300 includes generating 302 a first thrust on an airflow at a first stage of an electric multiple stage variable forced air induction system. This first thrust may be generated by a fan and a motor that may be included in the first stage.

The method 300 includes generating 304 a second thrust on the airflow at a second stage of the electric multiple stage variable forced air induction system, wherein the first thrust and the second thrust interact to create a combined thrust acting to drive the airflow as the airflow travels through the electric multiple stage variable forced air induction system. This second thrust may be generated by a fan and a motor that may be included in the second stage.

The magnitude of the combined thrust generated by method 300 may be greater than the magnitude of the first thrust. The magnitude of the combined thrust generated by method 300 may be greater than the magnitude of the second thrust. The magnitude of the combined thrust generated by method 300 may be less than the magnitude of the first thrust. The magnitude of the combined thrust generated by method 300 may be less than the magnitude of the second thrust. The direction of the first thrust may be the same as the direction of the second thrust. The direction of the first thrust may be different than, or opposite of, the direction of the second thrust.

The method 300 includes directing 306 the airflow toward an opening at an end of the electric multiple stage variable forced air induction system. The airflow may be directed to an opening at the input end of the electric multiple stage variable forced air induction system. From the input end, the airflow may travel through the opening in the input end and away from an intake of the combustion engine that is coupled to the output end. Alternatively, the airflow may be directed to an opening at the output end of the electric multiple stage variable forced air induction system. From the output end, the airflow may travel through the opening of the output end and into an intake of the combustion engine that is coupled to the output end.

Figure 4:
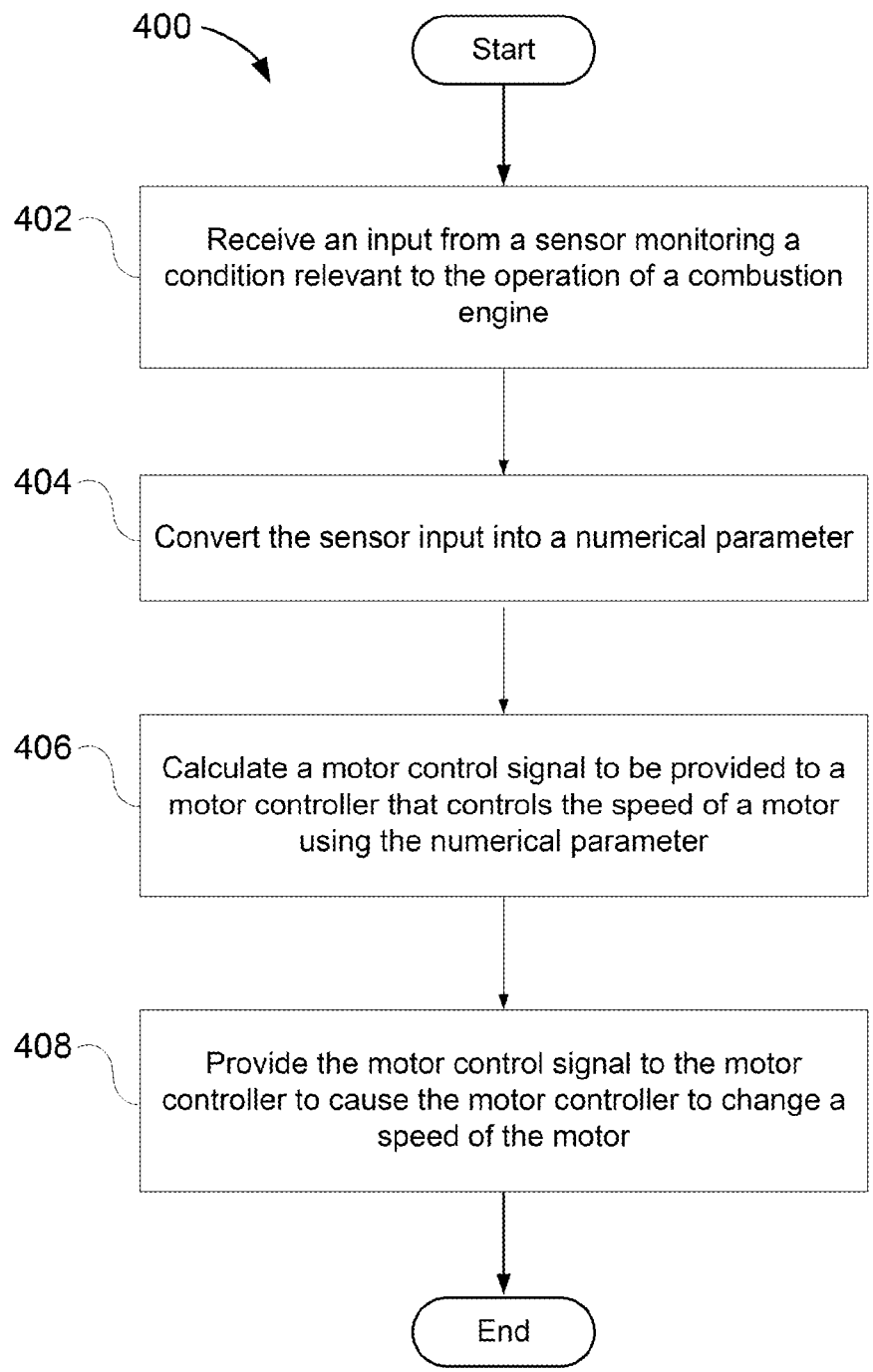
FIG. 4 is a flow diagram of a method of an electric multiple stage variable forced air induction system, according to one embodiment, for providing forced air induction of a combustion engine.

FIG. 4 is a flow diagram of a method 400 for forced air induction of a combustion engine, according to one embodiment. The method 400 may be implemented by an electric multiple stage variable forced air induction system, according to one embodiment. The method 400 may be performed by a processor in communication with a motor controller that in turn controls one or more motors of the electric multiple stage variable forced air induction system. The motor controller may be separate from the processors, or the motor controller may be included on the same computer chip as the processor.

The method 400 may include receiving 402 an input from a sensor monitoring conditions relevant to the operation of a combustion engine. The input may be received as an analog value (e.g., directly from a TPS sensor). Alternatively, the input may be received as a reported value corresponding to a sensor (e.g., a reported value from a CAN bus). The input may be a TPS, or it may be any other sensor that monitors conditions relevant to the operation of a combustion engine.

The method 400 may further include converting 404 the sensor input into a numerical parameter. The numerical parameter may be converted from an analog value indicated by a sensor and taken as a sensor input. The numerical parameter may instead be converted from a reported value corresponding to a sensor (e.g., a reported value from a CAN bus).

The method 400 may further include calculating 406 a motor control signal to be provided to a motor controller that controls the speed of the motor using the numerical parameter. The calculated motor control signal may be a PWM signal. It may alternatively be a voltage signal or a current signal. It may alternatively be a digital signal (passed in serial or in parallel) representing a value. It may alternatively be any other signal configured to be read by a motor controller.

The method 400 may further include providing 408 the motor control signal to the motor controller to cause the motor controller to change a speed of the motor. The change caused by the receipt of the signal at the motor controller may cause the motor to speed up, slow down, maintain its velocity, stop, or even to rotate in an opposite direction.

This disclosure has been made with reference to various embodiments, including the best mode. However, those skilled in the art will recognize that changes and modifications may be made to the embodiments without departing from the scope of the present disclosure. While the principles of this disclosure have been shown in various embodiments, many modifications of structure, arrangements, proportions, elements, materials, and components may be adapted for a specific environment and/or operating requirements without departing from the principles and scope of this disclosure. These and other changes or modifications are intended to be included within the scope of the present disclosure.

This disclosure is to be regarded in an illustrative rather than a restrictive sense, and all such modifications are intended to be included within the scope thereof. Likewise, benefits, other advantages, and solutions to problems have been described above with regard to various embodiments. However, benefits, advantages, solutions to problems, and any element(s) that may cause any benefit, advantage, or solution to occur or become more pronounced are not to be construed as a critical, required, or essential feature or element. The scope of the present invention should, therefore, be determined by the following claims:

The invention claimed is:

1. An electric multiple stage variable forced air induction system, comprising:
   a housing defining a conduit therethrough, an output opening to couple to and provide airflow to an air intake opening of a combustion engine, and an input opening to receive air for delivery through the conduit to the output opening;
   a plurality of stages to generate thrust to increase airflow through the conduit and to the air intake opening of the combustion engine, each stage of the plurality of stages comprising:
      a rotor disposed at the interior of the conduit to rotate about an axis aligned with the conduit and generate thrust on air as it passes through the conduit in a direction parallel to the axis, wherein the rotor accommodates backflow of air in a direction opposite the direction of the thrust being generated on the air, during the generation of the thrust by the rotor, to prevent over pressurization causing damage to the combustion engine; and
      a motor coupled to the rotor and configured to turn the rotor in a rotational direction to generate the thrust on the air,
      wherein the backflow occurs without a change in the rotational direction; and
   a control device to receive a first input indicating an engine parameter related to operating conditions of the combustion engine and to control the motor of a stage of the plurality of stages according to the first input.

2. The system of claim 1, wherein the rotor of each stage of the plurality of stages comprises an axial fan.

3. The system of claim 2, wherein fan blades of the axial fan of the rotor of a first stage of the plurality of stages differ in size, blade profile, diameter, pitch, and/or shape from the fan blades of the axial fan of the rotor of a second stage of the plurality of stages.

4. The system of claim 1, wherein the rotor of a first stage of the plurality of stages comprises an axial fan that is tuned differently than an axial fan of the rotor of a second stage of the plurality of stages.

5. The system of claim 1, wherein the motor of a first stage of the plurality of stages is controlled independently from the motor of a second stage of the plurality of stages.

6. The system of claim 1, wherein the first input indicates a current position of a throttle of the combustion engine.

7. The system of claim 6, wherein the control device increases the speed of the motor of one stage of the plurality of stages in response to the indication of the current throttle position.

8. The system of claim 6, wherein the control device decreases the speed of the motor of one stage of the plurality of stages in response to the indication of the current throttle position.

9. The system of claim 1, wherein the control device receives a second input indicating an engine parameter related to operating conditions of the combustion engine and controls the motor of a stage of the plurality of stages according to the second input.

10. The system of claim 9, wherein the second input indicates atmospheric pressure.

11. A method for forced air induction of a combustion engine, comprising:
receiving an input indicating an engine parameter related to operating conditions of a combustion engine;
generating a first thrust on an airflow in a first thrust direction at a first stage of an electric multiple stage variable forced air induction system based on the received input, the electric multiple stage variable forced air induction system comprising a conduit having an input end and an output end, wherein the output end is coupled to and in fluid communication with an intake of the combustion engine, and wherein the first stage allows backflow of air in a direction opposite the first thrust direction while the first stage generates thrust in the first thrust direction to thereby prevent over pressurization causing engine damage; and
generating a second thrust on the airflow in a second thrust direction at a second stage of the electric multiple stage variable forced air induction system based on the received input, wherein the first thrust and the second thrust interact to create a combined thrust acting to drive the airflow as the airflow travels through the electric multiple stage variable forced air induction system, and wherein the second stage allows backflow of air in a direction opposite the second thrust direction while the second stage generates thrust in the second thrust direction to thereby prevent over pressurization causing engine damage; and
directing the airflow toward an opening at one of the plurality of ends of the electric multiple stage variable forced air induction system.

12. The method of claim 11, wherein a magnitude of the combined thrust is greater than a magnitude of the first thrust.

13. The method of claim 11, wherein a magnitude of the combined thrust is less than a magnitude of the first thrust.

14. The method of claim 11, wherein a direction of the first thrust is opposed to a direction of the second thrust.

15. The method of claim 11, wherein the airflow is directed toward an opening in the output end of the electric multiple stage variable forced air induction system.

16. The method of claim 11, wherein the airflow is directed toward an opening in the input end of the electric multiple stage variable forced air induction system.

17. A method of an electric multiple stage variable forced air induction system, the method comprising:
receiving, at a processor, an input from a sensor monitoring conditions relevant to the operation of a combustion engine coupled to the electric multiple stage variable forced air induction system;
converting, at the processor, the sensor input into a numerical parameter;
calculating, at the processor, a motor control signal to be provided to a motor controller that controls the speed of the motor using the numerical parameter; and
providing, via the processor, the motor control signal to the motor controller to cause the motor controller to change a speed of the motor,
wherein the motor drives a rotor of an axial fan in a rotational direction about an axis to generate thrust on air in a direction parallel to the axis as it passes through a conduit of the axial fan, wherein the axial fan accommodates backflow of air in a direction opposite the direction of the thrust being generated on the air and without a change in the rotational direction.

18. The method of claim 17, wherein the motor control signal is calculated linearly corresponding to the numerical parameter.

19. The method of claim 17, wherein the sensor providing the input is a throttle position sensor.

* * * * *